US012583969B2

(12) United States Patent
Quinebeche et al.

(10) Patent No.: US 12,583,969 B2
(45) Date of Patent: Mar. 24, 2026

(54) METHOD FOR THE CONTINUOUS PREPARATION OF POLYAMIDE PREPOLYMERS

(71) Applicant: ARKEMA FRANCE, Colombes (FR)

(72) Inventors: Sébastien Quinebeche, Serquigny (FR); Thierry Briffaud, Serquigny (FR); Gérald Romazini, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 449 days.

(21) Appl. No.: 18/252,011

(22) PCT Filed: Nov. 10, 2021

(86) PCT No.: PCT/FR2021/051988
§ 371 (c)(1),
(2) Date: May 5, 2023

(87) PCT Pub. No.: WO2022/101581
PCT Pub. Date: May 19, 2022

(65) Prior Publication Data
US 2024/0010793 A1 Jan. 11, 2024

(30) Foreign Application Priority Data

Nov. 12, 2020 (FR) .................................. FR2011602

(51) Int. Cl.
| | |
|---|---|
| *C08G 69/30* | (2006.01) |
| *B29B 7/48* | (2006.01) |
| *B29B 7/82* | (2006.01) |
| *C08G 69/06* | (2006.01) |
| *B29K 77/00* | (2006.01) |
| *B29K 105/00* | (2006.01) |

(52) U.S. Cl.
CPC ............... *C08G 69/30* (2013.01); *B29B 7/48* (2013.01); *B29B 7/82* (2013.01); *C08G 69/06* (2013.01); *B29K 2077/00* (2013.01); *B29K 2105/0094* (2013.01)

(58) Field of Classification Search
CPC .......... C08G 69/30; C08G 69/06; B29B 7/48; B29B 7/82; B29K 2077/00; B29K 2105/0094
See application file for complete search history.

(56) References Cited

U.S. PATENT DOCUMENTS

| | | | |
|---|---|---|---|
| 8,765,902 | B2 | 7/2014 | Desbois et al. |
| 9,453,107 | B2 | 9/2016 | Lagneaux et al. |
| 2013/0131305 | A1 | 5/2013 | Häffner |
| 2015/0191569 | A1 | 7/2015 | Lagneaux et al. |

FOREIGN PATENT DOCUMENTS

| | | | | |
|---|---|---|---|---|
| CN | 104530421 A | 4/2015 | | |
| EP | 0410650 A1 * | 1/1991 | ............ | B29C 48/67 |
| EP | 2877516 B1 | 4/2018 | | |
| JP | H0381326 A | 4/1991 | | |
| JP | 2001200052 A | 7/2001 | | |
| JP | 2009203422 A | 9/2009 | | |
| JP | 2015522703 A | 8/2015 | | |
| JP | 2016528312 A | 9/2016 | | |

OTHER PUBLICATIONS

International Search Report (PCT/ISA/210) with translation and Written Opinion (PCT/ISA/237) mailed on Feb. 18, 2022, by the European Patent Office as the International Searching Authority for International Application No. PCT/FR2021/051988. (12 pages).
Eichhorn et al., "Characterization of Low Molecular Weight Carboxyl-Terminated Polyamides Obtained by Reactive Extrusion of Polyamide 6 With Trimellitic Anhydride", Journal of Applied Polymer Science, 1996, pp. 2053-2060, vol. 62, No. 12.
Notice of Reasons for Rejection (with English translation) issued on Dec. 2, 2025, by Japan Patent Office (JPO), in Japanese Patent Application 2023-528034, 10 pages.

* cited by examiner

*Primary Examiner* — Jiangtian Xu
(74) *Attorney, Agent, or Firm* — Boone IP Law

(57) ABSTRACT

The present invention relates to a method for continuously preparing a polyamide prepolymer, the viscosity in solution of which is comprised between 0.25 dL/g and 0.70 dL/g, as measured according to ISO 307:2007 in m-cresol at 20° C., the method being characterized in that it comprises a step of polycondensation on the basis of one or more polyamide precursor monomers, said polycondensation step being carried out in a extruder comprising at least two co-rotating conveying screws, the at least one monomer being previously added therein in solid or liquid form without being dissolved in a solvent or in water, and said polycondensation step being carried out without extracting the water formed during said poly-condensation.

13 Claims, No Drawings

METHOD FOR THE CONTINUOUS PREPARATION OF POLYAMIDE PREPOLYMERS

TECHNICAL FIELD

The present patent application relates to a method for the continuous preparation of polyamide prepolymers, by polycondensation, as well as extruders suitable for implementing such a method.

PRIOR ART

Polyamides (PA) are conventionally prepared by polycondensation of a diamine with a dicarboxylic acid, or an amino acid, or else a lactam, in a reactor by a batch method in which the monomer(s) are added and heated under pressure until a mixture of sufficient viscosity is obtained. The monomers are frequently added in aqueous solution and the water present and/or formed during the polycondensation must be removed by placing the reactor under reduced pressure.

However, the molar mass of the polyamide is difficult to control/manage due to its "living" nature because during the emptying of the reactor, the product may not have the same molar mass (the same viscosity) at the start and at the end of the emptying of the reactor.

If the targeted molar mass is exceeded, it is no longer possible to go back and the product is "declassified" for the entire batch produced.

Furthermore, the batch method is a more capital intensive method (for a quantity of product manufactured annually) and less ecological (more energy and water consumption, more production of gaseous effluent and waste, etc.).

Furthermore, the removal of water frequently also leads to a loss of the monomers added, in particular in the case of polycondensation of diamines with dicarboxylic acids, which requires working with an excess of monomers and therefore causes an added cost for the method.

More recently, methods for continuous synthesis have been developed.

Thus, patent EP 2,877,516 describes a method for continuous synthesis of polyamide with a weight-average molecular weight (Mw) of greater than or equal to 14,000 g/mol. This method requires at least two water discharge operations and leads not to prepolymers but to polymers.

U.S. Pat. No. 8,765,902 describes a method for the continuous preparation of 6T/6I copolyamide. This method requires the evaporation of the water and does not lead to prepolymers but to polymers.

Patent EP 0,410,650 describes a method for continuous preparation of prepolymers by the polycondensation of diamines and dicarboxylic acids. This method requires the evaporation of the water.

There is therefore a need to overcome the problems described above and one of the objectives of the present invention is to propose a method for preparing polyamide prepolymers that is simpler, faster, more reliable and less expensive than the methods from the prior art.

The present invention therefore relates to a method for continuous preparation of a polyamide prepolymer, whose viscosity in solution is between 0.25 dL/g and 0.70 dL/g, as measured according to ISO 307:2007 in m-cresol at 20° C., characterized in that it comprises a step of polycondensation from one or more polyamide precursor monomers, said polycondensation step being carried out in a single extruder comprising at least two co-rotating conveying screws, said monomer(s) being previously added in solid or liquid form without dissolving in a solvent or in water, and said polycondensation step being carried out without extracting the products formed, in particular water formed during said polycondensation.

The Inventors have therefore found that a compromise between the residence time of the material in the extruder with the reaction temperature in the extruder could be found without this requiring the removal of water, in particular by placing the extruder under vacuum.

Indeed, placing a prepolymer under vacuum in an extruder in order to remove the water is a technical difficulty since, because of the low viscosity, the medium tends to foam and to rise very easily in the vacuum line. This therefore causes clogging and loss of effectiveness of the vacuum.

Since the residence time is always the same in the extruder, the product formed therefore always has the same number-average molecular weight (Mn) or the same viscosity for a given extrusion temperature.

The product formed may also be characterized in line, which makes it possible by feedback to modify the method parameters in order to guarantee the proper control of the finished product.

Throughout the description, the term prepolymer has the same meaning as the term oligomer.

The term prepolymer denotes a polyamide having a number-average molecular weight Mn of less than 10,000 g/mol, in particular from 1,000 to 9,000, in particular from 1,500 to 7,000, and more particularly from 2,000 to 5,000 g/mol.

The Mn is determined in particular by calculation from the level of the terminal functions determined by potentiometric titration in solution and the functionality of said pre-polymers or by NMR assay (Postma et al. (Polymer, 47, 1899-1911 (2006)).

It may also be determined by size exclusion chromatography.

In the polymerization by polycondensation, and in particular the polycondensation of diamine and dicarboxylic acid or else of a single monomer comprising both a carboxylic acid function and an amine function, each step is a condensation reaction which is carried out with eliminating small molecules, called reaction by-products, such as $H_2O$, depending on the monomers involved.

In the method of the invention, there is no elimination during the reaction of the by-products formed and in particular of the water formed, which means that the extruder does not have any devices for discharging the reaction by-product(s) formed by the polycondensation reaction (which is water in the majority of cases) above the screws where the reaction takes place.

In particular, the extruder does not have any degassing devices or any device for removing the polycondensation by-product(s) formed, and in particular of the water formed, consisting of an outlet on the outside at atmospheric pressure, or of an outlet connected to a device making it possible to create a low-pressure zone in the extruder, such as a vacuum pump during the reaction.

The extruder is nevertheless equipped with a device for returning to atmospheric pressure after completion of the reaction and therefore after the screws.

The extruder used comprises at least two conveying screws.

The method for preparing a polyamide according to the invention includes the following successive steps, all carried out within the extruder:

After adding the selected monomers, a step of melting the solid fusible monomer(s), a step of mixing the monomer(s) thus melted and the liquid monomer(s) the liquid and/or non-fusible solid monomer(s), and a polycondensation step carried out by performing shearing operations on the material conveyed by the conveying screws. The melting and mixing steps may be combined in a single step.

In a preferred manner, a step is also carried out of forming a continuously renewed cap or seal by conveying the material on the conveying screws, between the melting and mixing steps and between the mixing and polycondensation steps. Advantageously, the cap or seal formed of the material in progress fills all the volume available for the passage of the material and formed a zone which is hermetically sealed to vapors, and in particular to the monomer vapors which may be generated.

In an extruder, each conveying screw consists of different elements which follow one another in the direction of conveyance. These different elements are placed next to one another on a rotation shaft. In a co-rotating extruder all the conveying screws turn in the same direction, which usually corresponds to the counterclockwise direction. The elements are located next to one another in a single line in the case of a linear extruder, or in a circle in the case of an annular extruder. The different conveying screws constituting an extruder all have the same diameter which remains constant all along the conveying screw. Most often, this diameter belongs to the range from 18 to 134 mm.

Such an extruder is in particular described in patent EP 2,877,516 with the exclusion of the elements for reduced pressure or for extraction of the by-products formed which are not present in the method of the invention.

The monomers that are precursors of the polyamides are previously added in solid or liquid form as a function of their natural appearance, but are in no case dissolved in any solvent or in water.

The expression "previously" means that the monomers are added before any start of the polycondensation reaction.

In the context of the invention, the monomers are added, without prior reaction and without prior preparation of the corresponding salt.

Regarding the Polyamide

The nomenclature used to define the polyamides is described in ISO 1874-1:2011 standard "Plastics—Polyamide (PA) Moulding And Extrusion Materials—Part 1: Designation" and is well known to a skilled person.

The polyamide may be any polyamide whether it is an aliphatic, cycloaliphatic, aromatic or semi-aromatic polyamide.

It may be a homopolyamide or copolyamide.

Advantageously, said polyamide is a homopolyamide.

Said aromatic polyamide is in particular obtained from the polycondensation of an arylamine which may be selected from meta-xylylene diamine (MXD, CAS number: 1477-55-0) or para-xylylene diamine (PXD, CAS number: 539-48-0), with an aromatic dicarboxylic acid, in particular selected from terephthalic acid, isophthalic acid and naphthalenic acid.

Said semi-aromatic polyamide, optionally modified with urea units, may particularly be a semi-aromatic polyamide of formula X/YAr, as described in EP1,505,099, particularly a semi-aromatic polyamide of formula A/XT in which A is selected from a unit obtained from an amino acid monomer, a unit obtained from a lactam monomer and a unit corresponding to the formula (Ca diamine)·(Cb diacid), both representing monomers, with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;

X.T denotes a unit obtained from the polycondensation of a Cx diamine and terephthalic acid, with x representing the number of carbon atoms of the Cx diamine, x being between 6 and 36, advantageously between 9 and 18, in particular a polyamide with formula A/6T, A/9T, A/10T or A/11T, A being as defined hereinbefore, in particular a polyamide PA 6/6T, a PA 66/6T, a PA 61/6T, a PA MPMDT/6T, a PA MXDT/6T, a PA PA11/10T, a PA 5T/10T, a PA 11/5T/10T, a PA 11/6T/10T, a PA MXDT/10T, a PA MPMDT/10T, a PA BACT/10T, a PA BACT/6T, PA BACT/10T/6T, a PA 11/BACT/10T, a PA 11/BACT/6T a PA 11/MPMDT/10T and a PA 11/MXDT/10T, and block copolymers, particularly polyamide/polyether (PEBA).

T corresponds to terephthalic acid, MXD corresponds to m-xylylene diamine, MPMD corresponds to methylpentamethylene diamine and BAC corresponds to bis(aminomethyl)cyclohexane.

Said cycloaliphatic polyamide is in particular obtained by polycondensation of the following monomers: a cycloaliphatic diamine with an aliphatic dicarboxylic acid or an aliphatic diamine with a cycloaliphatic dicarboxylic acid or a cycloaliphatic diamine with a cycloaliphatic dicarboxylic acid.

The cycloaliphatic diamine can be chosen for example from bis(3,5-dialkyl-4-aminocyclohexyl)-methane, bis(3,5-dialkyl-4-aminocyclohexyl)ethane, bis(3,5-dialkyl-4-aminocyclohexyl)-propane, bis(3,5-dialkyl-4-aminocyclohexyl)-butane, bis-(3-methyl-4-aminocyclohexyl)-methane or 3'-dimethyl-4,4'-diamino-dicyclohexyl-methane commonly called "BMACM" or "MACM" (and noted B below), p-bis(aminocyclohexyl)-methane commonly called "PACM" (and noted P below), isopropylidenedi(cyclohexylamine) commonly called "PACP", isophorone-diamine (noted IPD below) and 2,6-bis(amino methyl)norbornane commonly called "BAMN."

A non-exhaustive list of these cycloaliphatic diamines is given in the publication "Cycloaliphatic Amines" (Encyclopedia of Chemical Technology, Kirk-Othmer, 4th Edition (1992), pp. 386-405).

The cycloaliphatic dicarboxylic acid may comprise the following carbon backbones: norbornylmethane, cyclohexane, cyclohexylmethane, dicyclohexylmethane, dicyclohexylpropane, di(methylcyclohexyl) or di(methylcyclohexyl) propane.

The aliphatic diamine and the aliphatic dicarboxylic acid are as for the aliphatic polyamide described below.

Said aliphatic polyamide may be derived from the polycondensation of one or more monomer(s) which is (are) at least one C6 to C18, particularly C6 to C12, more particularly C10 to C12 carboxylic acid, in particular 11-aminoundecanoic acid.

Said aliphatic polyamide may be derived from the polycondensation of one or more monomer(s) which is (are) at least one C6 to C18, in particular C6 to C12, more particularly C10 to C12 lactam, in particular lauryllactam.

Said aliphatic polyamide may be derived from the polycondensation of one or more monomer(s) which is (are) at least one C6 to C18, in particular C6 to C12, more particularly 010 to C12 aliphatic diamine, and at least one C6 to C18, particularly C6 to C12, more particularly 010 to C12, aliphatic dicarboxylic acid.

The aliphatic diamine used is an aliphatic diamine that has a linear main chain comprising at least 6 carbon atoms.

This linear main chain can, if necessary, include one or several methyl and/or ethyl substituents; in the latter configuration, this is called a "branched aliphatic diamine". In the case where the main chain does not include any substituent, the aliphatic diamine is called a "linear aliphatic diamine."

When this diamine is a linear aliphatic diamine, it particularly corresponds to the formula $H_2N-(CH_2)x-NH_2$ and may be selected for example from hexanediamine, heptanediamine, octanediamine, nonanediamine, decanediamine, undecanediamine, dodecanediamine, tridecanediamine, tetradecanediamine, hexadecanediamine and octadecenediamine. The linear aliphatic diamines that have just been mentioned can all be bio-sourced in the sense of standard ASTM D6866.

When this diamine is a branched aliphatic diamine, it can in particular be 2-methyl-pentanediamine, 2-methyl-1,8-octanediamine or trimethylene (2,2,4 or 2,4,4) hexanediamine.

The dicarboxylic acid can be chosen from the linear or branched aliphatic dicarboxylic acids.

Advantageously, the diamine is a linear aliphatic diamine.

When the dicarboxylic acid is aliphatic and linear, it can be selected from adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioic acid (18).

Advantageously, the polyamide is a semi-aromatic, cycloaliphatic or semi-aromatic polyamide.

More advantageously, said polyamide is semi-aromatic or aliphatic, in particular said polyamide is aliphatic.

More advantageously, the polyamide is aliphatic and obtained from a single aminocarboxylic acid or from a single lactam, in particular it is obtained from 11-aminoundecanoic acid or lauryllactam, in particular it is obtained from 11-aminoundecanoic acid.

Regarding the Method

Preferably, the average degree of polymerization (DPn) of the polyamide obtained according to the method of the invention is less than 50, in particular less than or equal to 45, in particular between 5 and 45.

Advantageously, the average degree of polymerization (DPn) of the polyamide obtained according to the method of the invention is from 8 to 40, in particular from 12 to 30.

The term "average degree of polymerization (DPn)" means the average number of structural units present in a polymer chain. The average degree of polymerization (DPn) is typically evaluated from the number-average molecular weight (Mn) of the polyamide according to the following formula:

$$DPn=Mn/M_0 \qquad \text{[Math 1]}$$

With

Mn the number-average molecular weight of the polyamide $M_0$ the number-average molecular weight of the monomers Advantageously, the weight-average molecular weight (Mn) of the polyamide obtained according to the method of the invention is less than g/mol, in particular between 1,000 and 9,000, in particular from 1,500 to 7,000, more particularly from 2,000 to 5,000 g/mol.

The weight-average molecular weight may be determined by size exclusion chromatography.

In one embodiment, said extruder comprises two to twelve co-rotating conveying screws.

In a first variant of this embodiment, said extruder is a twin-screw extruder comprising two co-rotating conveying screws.

Advantageously, in this first variant, said method is carried out at a temperature between 220 and 340° C., preferentially from 260 to 300° C.

In one embodiment of this first variant, the residence time of the material in the extruder at the temperature comprised between 220 and 340° C. allows executing the polycondensation reaction so as to arrive at the desired average degree of polymerization.

Advantageously, the desired degree of polymerization is comprised from 8 to 40, in particular from 12 to 30.

In one embodiment of this first variant, the residence time of the material in the extruder at the temperature comprised between 220 and 340° C. allows executing the polycondensation reaction so as to arrive at the desired viscosity between 0.25 and 0.7 dL/g.

In a second variant of this embodiment, said extruder is a comprising annular multi-screw extruder comprising at least 6 conveying screws, in particular 12 conveying screws, that are co-rotating.

In one embodiment of this second variant, the residence time of the material in the extruder at the temperature comprised between 220 and 340° C. allows executing the polycondensation reaction so as to arrive at the desired average degree of polymerization.

Advantageously, the desired degree of polymerization is comprised between 8 and 40, in particular from 12 to 30.

In one embodiment of this second variant, the residence time of the material in the extruder at the temperature comprised between 220 and 340° C. allows executing the polycondensation reaction so as to arrive at the desired viscosity between 0.25 and 0.7 dL/g.

Advantageously, the residence time of the material in the extruder of the first or second variant is greater than or equal to 1 minute, and in particular comprised between 1 and 10 minutes, in particular comprised between 2 and 6 minutes.

In another embodiment of one or the other of the two variants, the flow rate of the extruder is greater than or equal to 10 kg/h, in particular greater than or equal to 15 kg/h, in particular greater than or equal to 30 kg/h, more particularly greater than or equal to 50 kg/h.

Advantageously, the extruder used with a flow rate greater than or equal to 10 kg/h, in particular greater than or equal to 15 kg/h, in particular greater than or equal to 30 kg/h, more particularly greater than or equal to 50 kg/h is an extruder comprising six to twelve co-rotating conveying screws, in particular twelve co-rotating conveying screws.

In one embodiment, the length of the extruder comprising six to twelve co-rotating conveying screws, in particular twelve co-rotating conveying screws with the flow described above is greater than or equal to 30 L/D, in particular from 30 to 100 L/D.

In another embodiment, in the method of the invention, at least one additive is added during the polycondensation in the extruder.

One or more pigments or dyes may be given as examples of additives.

Mention may also be made of one or more additives which are selected from the group consisting of catalysts, anti-crater agents or spreading agents, reducers, antioxidants, reinforcing fillers, UV stabilizers, fluidization agents, corrosion inhibitors, or mixtures thereof.

In one embodiment of the method according to the invention, an in-line analysis is carried out during said method.

In a first variant of this latter embodiment, if the in-line analysis characterizes a resulting product having the required characteristics and in particular the desired degree of polymerization, then the operating parameters of the method, in particular the residence time and temperature pair of the extruder, are not modified.

In a second variant of this latter embodiment, if the in-line analysis characterizes a resulting product that does not have the required characteristics and in particular the desired degree of polymerization, then the operating parameters of the method, in particular the residence time and temperature pair of the extruder, are modified to make it possible to obtain a product having the required characteristics and in particular the desired degree of polymerization.

According to another aspect, the present invention relates to a product which could be obtained by the method as defined above.

The product therefore corresponds to the prepolymer obtained by the method defined above.

According to another aspect, the present invention relates to an extruder suited for implementing the method as defined above.

EXAMPLES

Example 1 (Comparative)

General procedure for the preparation of a prepolymer in a batch:

To a 14 liter autoclave reactor, 5 kg of the following raw materials are added:

500 g water, the diamine and the dicarboxylic acid and/or the amino acid, 0.1 g of a WACKER AK1000 antifoam agent (from Wacker Silicones).

The closed reactor is purged of its residual oxygen then heated to a material temperature of 230° C. After 30 minutes of stirring under these conditions, the pressurized vapor that formed in the reactor is relaxed progressively over 60 minutes, while progressively adjusting the material temperature of the material such that it stabilizes at Tf+10° C. at atmospheric pressure.

The oligomer (prepolymer) is then emptied through the bottom valve then cooled in a water bath then milled.

A PA11 prepolymer of Mn=3000 and viscosity 0.40 was prepared, without the use of diamine or dicarboxylic acid, from 11-aminoundecanoic acid (CAS 2432-99-7) in the solid state, according to this procedure with a residence time much longer (more than one hour) than that of the method described in examples 2 and 3 of the invention (between 1 and 5 minutes), Example 2 (Invention)

PA11 prepolymers were prepared from 11-aminoundecanoic acid (CAS 2432-99-7) in the solid state on a ZSK18M1 twin-screw extruder (Coperion) of diameter D=18 mm (length=40 D or 60 D) or on a twin-screw Evolum32HT extruder (EV32 Clextral) with a diameter D=32 mm (length=40 D), without extraction of the by-products formed during the polycondensation, under several temperature and flow rate conditions (Table 1 to Table 6):

ZSK18 Twin-Screw Extruder:

TABLE 1

| Profile screw | | | | 40D | | | | | | | |
|---|---|---|---|---|---|---|---|---|---|---|---|
| Flow rate (kg/hr) | | | 3 | | | | | | 2 | | |
| Temperature (° C.) | 260 | 270 | 280 | 290 | 300 | 320 | 260 | 270 | 280 | 290 | 300 |
| Screw speed (rpm) | | | 300 | | | | | | 300 | | |
| Viscosity in solution ISO 307:2007 (m-cresol at 20° C.) | 0.26 | 0.25 | 0.29 | 0.35 | 0.39 | 0.42 | 0.30 | 0.30 | 0.39 | 0.43 | 0.44 |

Temperature Profile (° C.):

TABLE 2

| T (° C.) Profiles | |
|---|---|
| 260° C.= | AT-40-40-40-40-100-150-250-260-260-260-260-260-260-260-260 |
| 270° C.= | AT-40-40-40-40-100-150-250-270-270-270-270-270-270-270-270 |
| 280° C.= | AT-40-40-40-40-100-150-250-280-280-280-280-280-280-280-280 |
| 290° C.= | AT-40-40-40-40-100-150-250-290-290-290-290-290-290-290-290 |
| 300° C.= | AT-40-40-40-40-100-150-250-300-300-300-300-300-300-300-300 |
| 310° C.= | AT-40-40-40-40-100-150-250-310-310-310-310-310-310-310-300 |
| 320° C.= | AT-40-40-40-40-100-150-250-320-320-320-320-320-320-320-300 |

AT = ambient temperature

TABLE 3

| Profile screw | | | 60D | | | |
|---|---|---|---|---|---|---|
| Flow rate (kg/hr) | | | 3 | | | |
| Temperature (° C.) | 250 | 260 | 270 | 280 | 290 | 300 |
| Screw speed (rpm) | | | 300 | | | |

TABLE 3-continued

| | | | | | | |
|---|---|---|---|---|---|---|
| Viscosity in solution ISO 307:2007 (m-cresol at 20° C.) | 0.26 | 0.28 | 0.32 | 0.36 | 0.42 | 0.44 |

Temperature Profile (° C.):

TABLE 4

| T (°C.) Profiles |
|---|
| 250° C.=    AT-100-150-250-250-250-250-250-250-250-250-250-250-250-250 |
| 260° C.=    AT-100-150-250-260-260-260-260-260-260-260-260-260-260-260 |
| 270° C.=    AT-100-150-250-270-270-270-270-270-270-270-270-270-270-270 |
| 280° C.=    AT-100-150-250-280-280-280-280-280-280-280-280-280-280-280 |
| 290° C.=    AT-100-150-250-290-290-290-290-290-290-290-290-290-290-290 |
| 300° C.=    AT-100-150-250-300-300-300-300-300-300-300-300-300-300-300 |

AT = ambient temperature

EV32 Twin-Screw Extruder:

TABLE 5

| Profile screw | | | | | 40D | | | | | |
|---|---|---|---|---|---|---|---|---|---|---|
| Flow rate (kg/hr) | 12 | 12 | 12 | 9 | 9 | 9 | 9 | 6 | 6 | 6 | 6 |
| Temperature (° C.) | 280 | 300 | 320 | 260 | 280 | 300 | 320 | 260 | 280 | 300 | 320 |
| Screw speed (rpm) | | 300 | | | | 225 | | | | 150 | |
| Viscosity in solution ISO 307:2007 (m-cresol at 20° C.) | 0.30 | 0.34 | 0.37 | 0.25 | 0.32 | 0.38 | 0.44 | 0.30 | 0.37 | 0.45 | 0.52 |

Temperature Profile (° C.):

TABLE 6

| T (°C.) Profiles |
|---|
| 260° C.=    AT/100/200/260/260/260/260/260/260-260 |
| 280° C.=    AT/100/200/280/280/280/280/280/280-260 |
| 300° C.=    AT/100/200/300/300/300/300/300/300-260 |
| 320° C.=    AT/100/200/320/320/320/320/320/320-260 |

Example 3 (Invention)

PA11 prepolymers were prepared from 11-aminounde-canoic acid (CAS 2432-99-7) in the solid state on an RE1 XPV (Extricom) extruder comprising 12 screws with diameter D=19 mm (length=36 D or 100 D) or on a RE3 XPV (Extricom) extruder comprising 12 screws with diameter D=31 mm (length=55 D), without extraction of the by-products formed during the polycondensation, under several temperature and flow rate conditions (Table 7 to Table 12):

Extruder Comprising 12 Screws RE1 XPV:

TABLE 7

| Profile screw | | | 36D | | | |
|---|---|---|---|---|---|---|
| Flow rate (kg/hr) | | | 6 | | 12 | |
| Temperature (° C.) | 240 | 260 | 280 | 300 | 280 | 300 |
| Screw speed (rpm) | | 25 | | | 55 | |
| Viscosity in solution ISO 307:2007 (m-cresol at 20° C.) | 0.42 | 0.48 | 0.57 | 0.63 | 0.32 | 0.38 |

Temperature Profile (° C.):

TABLE 8

| T (° C.) Profiles |
|---|
| 240° C.=    AT-240-240-240-240-240-240-240 |
| 260° C.=    AT-260-260-260-260-260-260-260 |

TABLE 8-continued

| T (° C.) Profiles |
|---|
| 280° C.=    AT-280-280-280-280-280-280-280 |
| 300° C.=    AT-300-300-300-300-300-300-300 |

AT = ambient temperature

TABLE 9

| Profile screw | 100D | | | | | |
|---|---|---|---|---|---|---|
| Flow rate (kg/hr) | | 24 | | | 36 | |
| Temperature (° C.) | 240 | 260 | 280 | 300 | 280 | 300 |
| Screw speed (rpm) | | 120 | | | 250 | |
| Viscosity in solution ISO 307:2007 (m-cresol at 20° C.) | 0.34 | 0.44 | 0.51 | 0.58 | 0.37 | 0.45 |

Temperature Profile (° C.):

TABLE 10

| T (° C.) Profiles |
|---|
| 240° C.=    AT-240-240-240-240-240-240-240-240-240-240-240-240-240-240-240-240 |
| 260° C.=    AT-260-260-260-260-260-260-260-260-260-260-260-260-260-260-260-260 |
| 280° C.=    AT-280-280-280-280-280-280-280-280-280-280-280-280-280-280-280-280 |
| 300° C.=    AT-300-300-300-300-300-300-300-300-300-300-300-300-300-300-300-300 |

AT = ambient temperature

Extruder Comprising 12 Screws RE3 XPV:

TABLE 11

| Profile screw | 55D | | | |
|---|---|---|---|---|
| Flow rate (kg/hr) | | 27 | 41 | |
| Temperature (° C.) | 260 | 280 | 260 | 280 |
| Screw speed (rpm) | | 60 | 120 | |
| Viscosity in solution ISO 307:2007 (m-cresol at 20° C.) | 0.38 | 0.26 | 0.44 | 0.33 |

Temperature Profile (° C.):

TABLE 12

| T (° C.) Profiles |
|---|
| 260° C.=    AT/260/260/260/260/260/260/260/260/260/260 |
| 280° C.=    AT/280/280/280/280/280/280/280/280/280/280 |

The continuous method of the invention makes it possible to prepare a PA11 prepolymer having the required solution viscosity with a residence time of a few minutes (between 1 and 5 minutes) very much lower than that necessary to obtain a PA11 prepolymer in a batch method (more than one hour).

The invention claimed is:

1. A method for the continuous preparation of a polyamide prepolymer, the viscosity in solution of which is comprised between 0.25 dL/g and 0.70 dL/g, as measured according to ISO 307:2007 in m-cresol at 20° C., said formulated polyamide prepolymer having a number-average molecular weight (Mn) less than 10,000 g/mol, as determined by calculation from the level of terminal functions determined by potentiometric titration in solution and the functionality of said prepolymers or by NMR assay or by size exclusion chromatography, wherein it comprises a step of polycondensation from one or more polyamide precursor monomers, said polycondensation step being carried out in a single extruder comprising at least two co-rotating conveying screws, the said monomer(s) being previously added in solid or liquid form without dissolving in a solvent or in water, and said polycondensation step being carried out without extraction of the products formed, said extruder not having any degassing devices, or of a device for removing the polycondensation by-product(s) formed, consisting of an outlet on the outside at atmospheric pressure, or of an outlet connected to a device making it possible to create a low-pressure zone in the extruder.

2. The method according to claim 1, wherein the average degree of polymerization (DPn) of the resulting polyamide is less than 50, as determined from the number-average molecular weight (Mn) of the polyamides according to the following formula:

$$DPn = Mn/M0 \qquad \text{[Formula 1]}$$

with

Mn, the number-average molecular weight of the polyamide,

M0 the number-average molecular weight of the monomers.

3. The method according to claim 1, wherein the polyamide is an aliphatic polyamide.

4. The method according to claim 3, wherein the monomer(s) is (are) at least one C6 to C18.

5. The method according to claim 3, wherein the monomer(s) is (are) at least one C6 to C18 lactams.

6. The method according to claim 3, wherein the monomer(s) is (are) at least one C6 to C18 aliphatic diamine, and at least one C6 to C18 aliphatic dicarboxylic acid.

7. The method according to claim 1, wherein the extruder is a twin-screw extruder with two co-rotating conveying screws.

8. The method according to claim 7, wherein it is carried out at a temperature comprised between 220 and 340° C., preferentially comprised between 260 and 300° C.

9. The method according to claim 8, wherein the residence time of the material in the extruder at the temperature comprised between 220 and 340° C. allows executing the polycondensation reaction so as to arrive at the desired average degree of polymerization, said residence time being greater than or equal to 1 minute.

10. The method according to claim 1, wherein the extruder is an annular multi-screw extruder comprising at least 6 screws, that are co-rotating.

11. The method according to claim 10, wherein the residence time of the material in the extruder at the temperature comprised between 220 and 340° C. allows executing the polycondensation reaction so as to arrive at the desired average degree of polymerization, said residence time being greater than or equal to 1 minute.

12. The method according to claim 7, wherein the residence time of the material in the extruder is greater than or equal to 1 minute.

13. The method according to claim 1, wherein at least one additive is added during the polycondensation in the extruder.

\* \* \* \* \*